United States Patent [19]

Kulischenko

[11] 4,421,495
[45] Dec. 20, 1983

[54] BALANCED COMPOSITE FLEXIBLE SHAFT ASSEMBLY CAPABLE OF OPERATING IN A TIGHT RADIUS

[75] Inventor: Walter Kulischenko, East Brunswick, N.J.

[73] Assignee: Pennwalt Corporation, Philadelphia, Pa.

[21] Appl. No.: 360,544

[22] Filed: Mar. 22, 1982

[51] Int. Cl.³ .............................................. F16D 3/66
[52] U.S. Cl. ................................................... 464/51
[58] Field of Search .................. 464/52, 51, 50, 73, 464/79, 81, 147, 170, 86, 57, 173, 178, 179

[56] References Cited

U.S. PATENT DOCUMENTS

| 216,858 | 6/1879 | Justi . | |
|---|---|---|---|
| 1,042,760 | 10/1912 | Bradley | 464/179 X |
| 1,232,922 | 7/1917 | Hobbs | 464/86 |
| 1,897,542 | 2/1933 | West | 464/179 X |

FOREIGN PATENT DOCUMENTS

| 654418 | 12/1937 | Fed. Rep. of Germany | 464/52 |
|---|---|---|---|
| 3024413 | 1/1982 | Fed. Rep. of Germany | 464/181 |
| 502194 | 1/1956 | Italy | 464/52 |
| 42973 | 6/1926 | Norway | 464/52 |
| 617629 | 7/1978 | U.S.S.R. | 464/52 |

Primary Examiner—John M. Jillions

[57] ABSTRACT

Flexible shaft assembly includes a central flexible shaft having its ends permanently affixed within axial bores provided in a pair of end fittings. The end fittings are also provided with a plurality of outer bores disposed symmetrically around the axial bores for receiving the ends of a plurality of outer flexible shafts. At least one end of an end fitting's outer bores receives the ends of one end of the outer flexible shafts in free-floating relationship enabling the assembly to maintain substantial symmetrical disposition of the shafts even when rotating in a tight radius of curvature while transmitting high torques. Bearing supports however may be required to maintain the rotating flexible shafts along a predetermined tight path. By selecting shafts of proper lay, i.e., right-lay and left-lay, the entire assembly may be substantially torsionally balanced.

15 Claims, 6 Drawing Figures

BALANCED COMPOSITE FLEXIBLE SHAFT ASSEMBLY CAPABLE OF OPERATING IN A TIGHT RADIUS

STATEMENT OF THE INVENTION

This invention relates to a balanced composite flexible shaft assembly capable of transmitting high torques while rotating in a tight radius.

BACKGROUND AND SUMMARY OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical or conventional rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, matallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control, usually 100 rpm or less, or intermittent high speed use, in either direction of rotation.

The present flexible shaft device may be used advantageously in either power driven or remote control applications.

Typical power driven applications of the present flexible shaft assembly include fan drives in confined spaces, as aboard submarines, for example; operating of portable power tools in cramped areas; and the like.

In most remote control applications, a minimum amount of torsional deflection, or "lag", between the control and controlled element is permissible, regardless of the direction of rotation of the shaft. It is virtually impossible to entirely eliminate torsional deflection, unless solid shafts are employed, because of the alternate layers of wires either winding or unwinding when the shaft is subjected to the torsional load. Regardless of the direction of rotation of the flexible shaft, it should operate smoothly and be free of any tendency to "jump".

A typical remote control application of the present composite assembly involves its use in automobile steering mechanisms. Flexible shafts improve the ability of the steering column to absorb energy in a frontal impact situation. The flexible shaft has one of its ends operably connected to the bottom of the steering shaft while its other end may be connected to some suitable coupling means capable of absorbing considerable road induced shake. At least one domestic car manufacturer requires the presence of a short flexible shaft in its steering mechanism to maintain a sinuous curve while rotating in either direction and yet be capable of transmitting high torques.

The present invention provides a balanced composite flexible shaft assembly capable of transmitting high torques while operating in a tight radius. The assembly comprises a central shaft which is permanently affixed at each end thereof to an end fitting member, and a plurality of shafts spaced outwardly of the central shaft and disposed symmetrically therearound, which outer shafts are permitted to free float in at least one of the end fittings. The entire assembly may be substantially torsionally balanced by employing right and left lay shafts. The central shaft and outer shafts are conventional rotatable flexible shafts.

Unbalanced torsional deflection of rotating flexible shafts is due primarily to the alternate lay of each successive layer of wires, i.e., a torsional load applied to the shaft in a "wind" direction which tends to tighten up the outer layer of wires will exhibit a lower deflection value than when subjected to an identical load in the unwind direction, which tends to loosen the wires of the outer layer.

Torsional deflection of flexible shafts is readily calculable. By selecting the direction of lay of the central and each of the outer shafts, and sizes, if necessary, substantially balanced torsional deflection of the present assembly may be achieved.

DETAILED DESCRIPTION OF THE INVENTION

Figure 1:
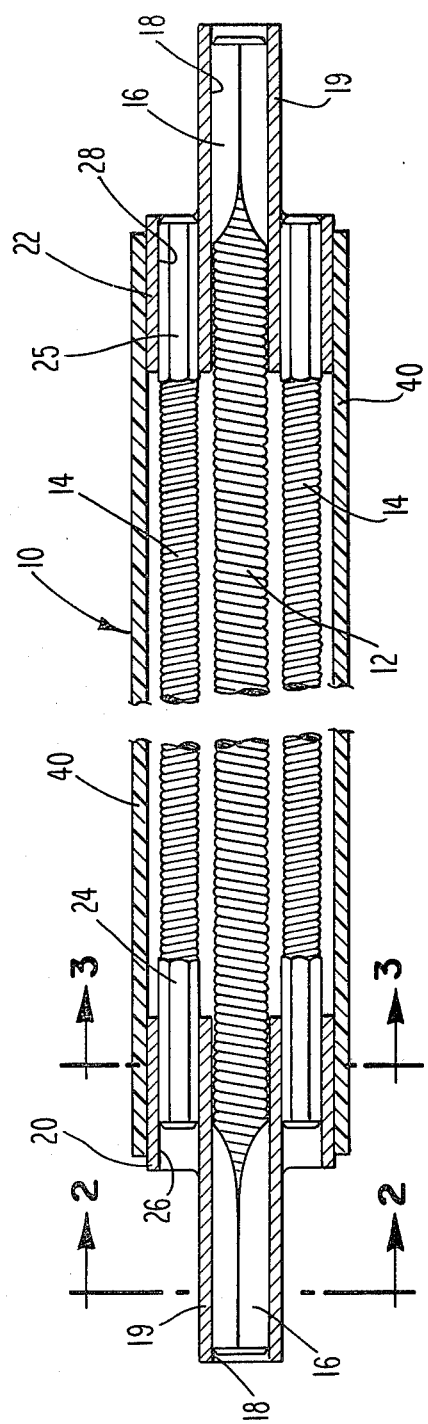
FIG. 1 is a longitudinal sectional view of the composite flexible shaft assembly of the present invention.

In FIG. 1, flexible shaft assembly 10 comprises a plurality of conventional rotatable flexible shafts including a central flexible shaft 12 and an array of flexible shafts 14, usually of smaller diameter than central shaft 12, disposed symmetrically therearound. Central shaft 12 includes a conventional integral formed square 16 at each end thereof, which ends are respectively received within a mating hollow square bore 18 provided in an extension 19 of end fitting members 20 and 22.

Figure 2:
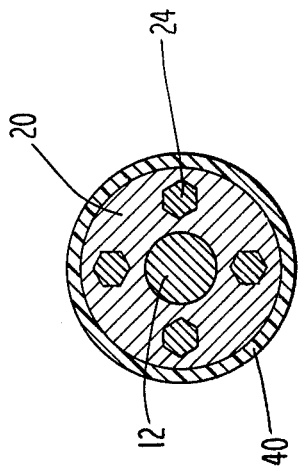
FIGS. 2 and 3 are sectional views of the assembly of FIG. 1 taken along lines 2—2 and 3—3 thereof.
Figure 3:
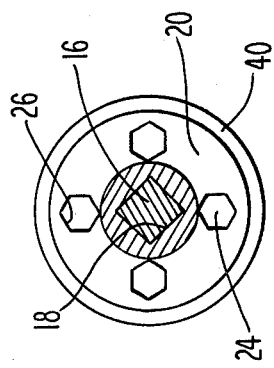

Four outer flexible shafts 14 are illustrated in FIGS. 2 and 3. Each outer flexible shaft 14 is provided with ends 24 and 25 which are hexagonal in cross-section, which ends are received within mating hexagonal bores 26 and 28 of end fittings 20 and 22 respectively.

Since the flexible shaft assembly 10 of the present invention may oftentimes be subjected to high torques while rotating in a tight radius, as in automobile steering applications, for example, it is preferred that the ends of outer flexible shafts 14 be hexagonal in cross-section, rather than square, although formed square ends or other suitable configurations may also be used. Integral formed squares 16 of central shaft 12 may be hexagonal, or otherwise suitably configured.

Ends 16 of central shaft 12 are permanently affixed, by swaging, for example, within extensions 19. Similarly, all the hexagonal ends 24 or 25 at one end of the flexible shaft assembly of each of the outer shafts 14 may be permanently affixed within their bores of the respective end fitting. If so constructed, the remaining hexagonal ends of outer shafts 14 are not so affixed. Thus, in FIG. 4, hexagonal ends 24 are permitted to free float within their bores 26 of end fitting member 20, which allows the array of outer flexible shafts 14 to substantially maintain their symmetrical disposition as shown in FIG. 5, resulting in shaft 14A being further withdrawn from its bore 26 than shaft 14B, for example.

Preferably, however, outer shafts 14 will not be affixed in either end fitting to thereby permit the outer shafts to free float at both ends. There is little danger of any of the outer shafts 14 exiting their respective bores while rotating since the outer shafts will not pass through the hexagonal bores 26 and 28 and the lengths of the end fittings are sufficiently long to accommodate the ends even when rotating in a tight radius.

The flexible shaft assembly aforedescribed requires no separators, orificed discs, or other means for maintaining the shafts in an untwisted and non-binding condition while rotating, even in a tight radius of curvature, in either power driven or remote control applications.

In certain applications of a dedicated nature however where the flexible shaft assembly must be routed along a predetermined path, typically an S-curve, one or more bearing assemblies 30 (FIGS. 4 and 6) may be required. A bearing assembly 30 includes a bearing support 32 which carries the central and outer shafts and rotates within a bearing member 34, supported by a support member 36, suitably screwed or otherwise attached to any convenient adjacent structure (not shown).

Figure 6:
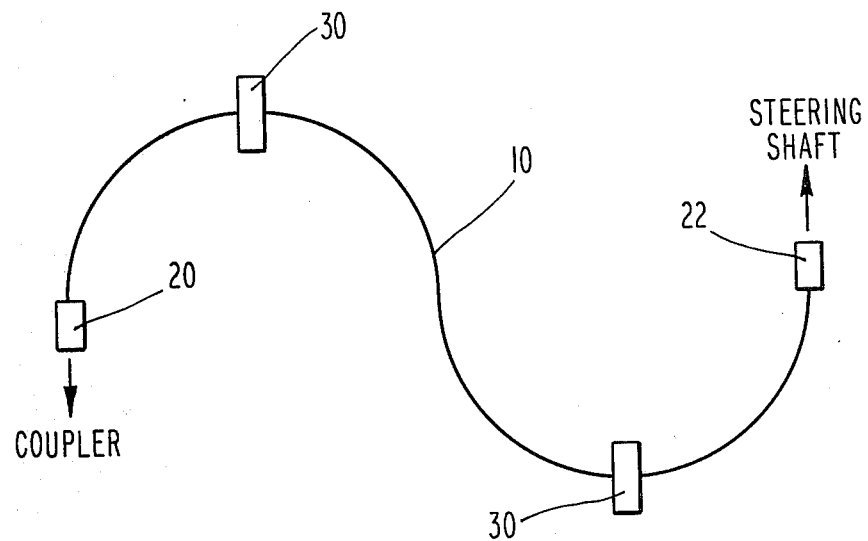
FIG. 6 is a diagrammatic illustration of the assembly of FIG. 4 employed in an automobile steering mechanism.

In FIG. 6, end fitting member 22 of the flexible shaft assembly 10 is connected to the bottom of an automobile steering shaft while the other end fitting member 20 is connected to a suitable tuned coupler. A pair of bearing assemblies 30 are required to fulfull the dedicated nature of the application, i.e., an S-curve route for the rotating flexible shaft assembly due to the presence of an anti-intrusion column and other components associated therewith.

The invention is not intended to be limited to 4 outer flexible shafts 14 and may include as few as 3 and up to 8 or more symmetrically disposed about the central shaft, which central shaft may be smaller than, or substantially identical in size with the outer shafts.

In the embodiment shown in FIGS. 1, 2, and 3, central shaft 12 has a diameter of ⅜ inch while the diameter of each of the four outer shafts is ¼ inch. If straight ¼ inch and ⅜ inch flexible shafts of the type described herein are capable of transmitting torques of about 93 and 250 pound-inches respectively, then the assembly 10 of FIG. 1 is capable of transmitting a torque of about 620 pound-inches. The total cross-sectional area of the shafts, i.e., central shaft 12 and 4 outer shafts 14, is approximately 0.3 square inch.

A single flexible shaft having a diameter of ⅝ inch, or approximately the same cross-sectional area of about 0.3 square inch, is capable of transmitting a torque of about 920 pound-inches in a straight condition. However, the flexible shaft assembly 10 of FIG. 1 may be operated in a tight radius of curvature of 8 inches while transmitting 364 pound-inches of torque in remote control applications, whereas the single ⅝ inch shaft, also for remote control applications, will operate in a radius of curvature requiring a minimum radius of 10 inches while only transmitting a torque of 275 pound-inches.

Additionally, if central shaft 12 is reduced in diameter to ¼ inch, the entire flexible shaft assembly 10 will yet transmit 230 pound-inches of torque while operating in a radius of curvature of only 6 inches.

The flexible shaft assembly 10 of FIG. 1 is encased by any suitable type casing 40 which will be disposed over end fittings 20 and 22 in order to help protect the assembly from dirt, moisture and foreign matter.

Where bearing supports 32 are required (FIG. 4), thin plastic boots 42 may be individually mounted between each end fitting and bearing support if only one such support is required, and additionally, between adjacent supports 32 if more than one support is required.

Figure 4:
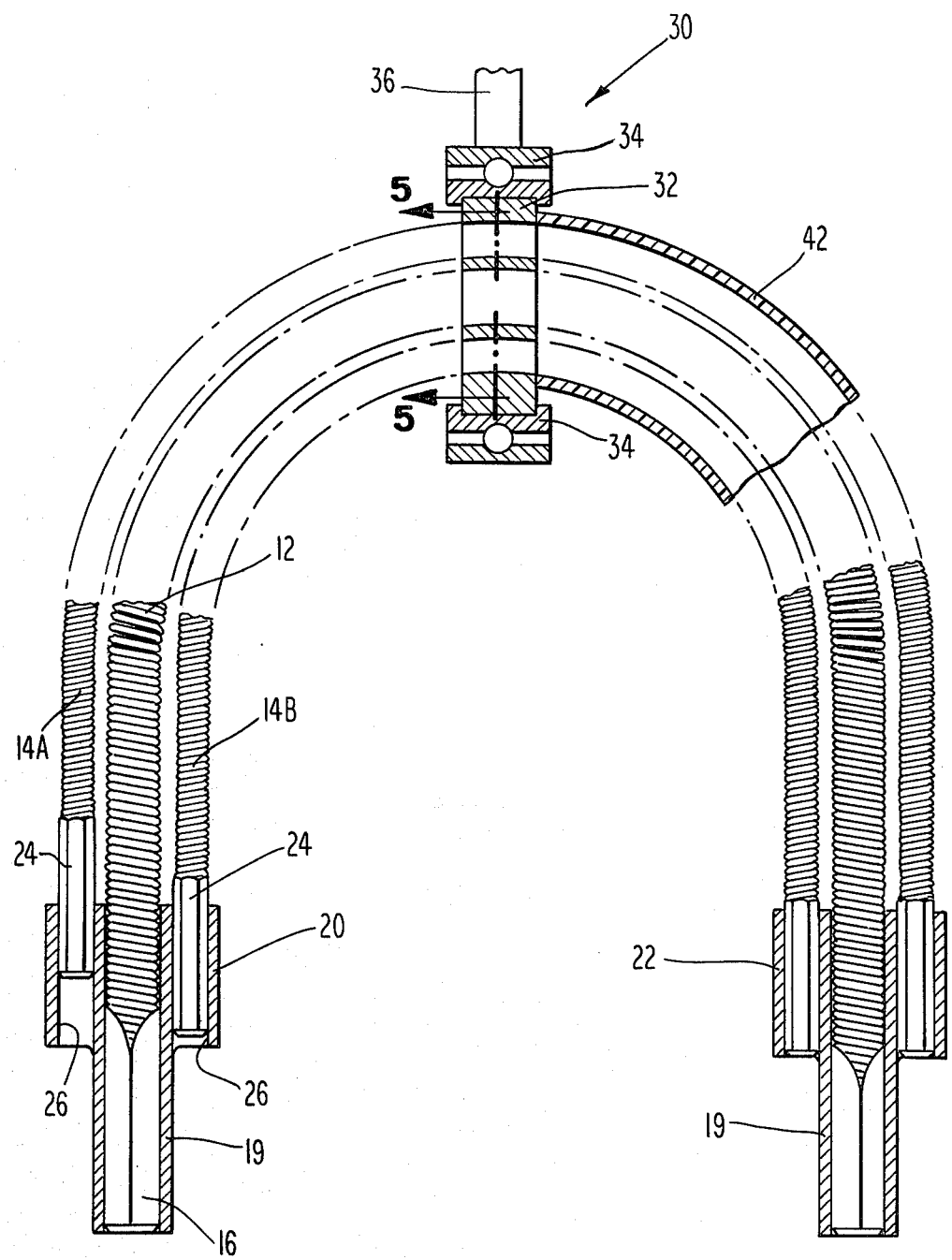
FIG. 4 is a longitudinal sectional view of a composite flexible shaft assembly of the present invention illustrated in a tight operating radius.
Figure 5:
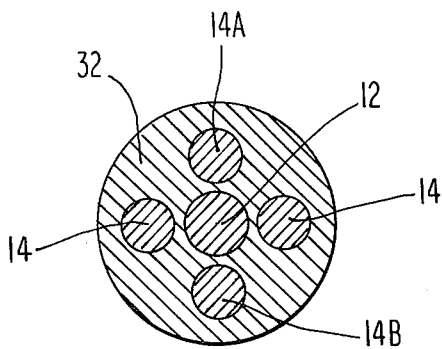
FIG. 5 is a sectional view of the assembly of FIG. 4 taken along line 5—5 thereof.

In torsionally balancing the present composite flexible shaft assembly, outer shafts 14 including shafts 14A and 14B of FIG. 4 may be considered right-lay shafts since the pitch direction of their outer layer of windings corresponds to a right-hand screw thread. Conversely, central shaft 12 may be considered left-lay. Torsional deflection of flexible shafts is an important consideration in many remote control applications, particularly in the steering of automobiles and marine vessels. The steering of either should provide a similar feel to the operator regardless of the direction of rotation of the steering wheel. Torsional deflection of flexible shafts is readily accurately calculable. Thus, by selecting the proper lay of the shafts used, a substantially balanced composite assembly will result. More particularly, a typical ¼ inch flexible shaft manufactured by the assignee of the present invention for use in steering applications will torsionally deflect about 10° and 13° per foot of shaft in the wind and unwind directions respectively whereas a ⅜ inch shaft of the same assignee will only torsionally deflect about 2.0° and 2.4° per foot of shaft in the wind and unwind directions respectively. Thus, if the 4 outer shafts 14 are of one lay and the central shaft 12 of the other lay, it is apparent that the composite flexible shaft assembly 10 will be generally torsionally balanced.

In a remote control automobile steering application, the flexible shaft assembly will normally have one of its ends conventionally connected to the bottom of the steering wheel shaft while its other end conventionally connected to a coupling means.

In other remote control applications or power driven applications, the extensions 19 of each end fitting member 20 and 22 may be exteriorly threaded and adapted to receive coupling nuts for both driving and driven ends; or the extensions 19 may be hexagonally or otherwise configured for insertion into mating driving and driven bores; or the extensions 19 may be secured to rotating members by set screws, and the like. Forks, tongues, splines, quick-disconnect devices, etc. may also be employed.

I claim:

1. An assembly of flexible shafts including a central flexible shaft and outer flexible shafts rotating in a tight radius of curvature while transmitting high torques comprising:
   a pair of end fittings each of which receives one end of each of said flexible shafts, each of said end fittings having an axial bore therethrough and a plurality of outer bores disposed symmetrically around said axial bore,
   said central flexible shaft having each end thereof affixed within one of said axial bores,
   said outer flexible shafts having their ends received within said outer bores to provide substantially symmetrical disposition of said outer flexible shafts about said central flexible shaft along entire length thereof, and means for rotating said assembly in said tight radius wherein said outer flexible shafts free float in at least one of said end fittings while rotating to thereby maintain said substantially symmetrical disposition of said shafts.

2. The assembly of claim 1 wherein said ends of each of said flexible shafts are polygonal in cross-section.

3. The assembly of claim 2 wherein said axial bores and said outer bores of said end fittings are polygonally configured to mate with each of said polygonally cross-sectioned flexible shaft ends.

4. The assembly of claim 3 wherein said central flexible shaft is provided with integral formed square ends.

5. The assembly of claim 4 wherein said axial bores are square.

6. The assembly of claim 5 wherein said outer flexible shafts are provided at each end thereof with ends hexagonal in cross-section.

7. The assembly of claim 6 wherein ends of said outer flexible shafts in one of said end fittings are affixed in said outer bores thereof.

8. The assembly of claim 6 wherein ends of said outer flexible shafts free float in each of said outer bores of said pair of end fittings.

9. The assembly of claim 8 wherein said outer flexible shafts comprise 3 to 8 flexible shafts.

10. The assembly of claim 9 wherein a flexible casing is mounted over said end fittings.

11. The assembly of claim 9 wherein said tight radius of curvature comprises an S-curve.

12. The assembly of claim 11 wherein said flexible shafts are urged into said S-curve configuration and maintained thereat during rotation thereof by means of at least one bearing support mounted between said end fittings, said bearing support comprising a disc having spaced passageways therein for receiving said flexible shafts therethrough in symmetrical disposition, said bearing support rotating with said flexible shafts.

13. The assembly of claim 1 wherein said central flexible shaft and outer flexible shafts comprise flexible shafts of right-lay and left-lay, said right-lay and left-lay flexible shafts being selected for said central flexible shaft and outer flexible shafts to provide substantial torsional balance to said assembly of flexible shafts in remote control and power driven applications.

14. A flexible shaft assembly for use in an automobile steering system wherein said assembly interconnects the steering shaft with a coupler, said assembly transmitting high torques while rotating in a tight radius of curvature and comprising:

a central flexible shaft and outer flexible shafts, a pair of end fittings each of which receives one end of each of said flexible shafts, each of said end fittings having an axial bore therethrough and a plurality of outer bores disposed symmetrically around said axial bore, said central flexible shaft having each end thereof affixed within one of said axial bores, said outer flexible shafts having their ends received within said outer bores to provide substantially symmetrical disposition of said outer flexible shafts about said central flexible shaft along entire length thereof, means for maintaining said assembly along a predetermined route in said tight radius of curvature, and other means for rotating said assembly in said tight radius of curvature wherein said outer flexible shafts free float in at least one of said end fittings while rotating to thereby maintain said substantially symmetrical disposition of said shafts.

15. The assembly of claim 14 wherein said tight radius of curvature comprises an S-curve.

* * * * *